United States Patent
Cheiky

(10) Patent No.: US 10,011,793 B2
(45) Date of Patent: Jul. 3, 2018

(54) COAXIAL GASIFIER FOR ENHANCED HYDROGEN PRODUCTION

(71) Applicant: V-GRID Energy Systems, Camarillo, CA (US)

(72) Inventor: Michael Cheiky, Camarillo, CA (US)

(73) Assignee: V-Grid Energy Systems, Camarillo, CA (US)

( * ) Notice: Subject to any disclaimer, the term of this patent is extended or adjusted under 35 U.S.C. 154(b) by 151 days.

(21) Appl. No.: 14/333,396

(22) Filed: Jul. 16, 2014

(65) Prior Publication Data

US 2016/0017244 A1 Jan. 21, 2016

Related U.S. Application Data

(60) Provisional application No. 61/856,228, filed on Jul. 19, 2013.

(51) Int. Cl.
| | |
|---|---|
| *C10J 3/84* | (2006.01) |
| *C10J 3/26* | (2006.01) |
| *C10J 3/62* | (2006.01) |
| *C10K 3/04* | (2006.01) |

(52) U.S. Cl.
CPC . *C10J 3/26* (2013.01); *C10J 3/62* (2013.01); *C10K 3/04* (2013.01); *C10J 2300/094* (2013.01); *C10J 2300/0916* (2013.01); *C10J 2300/0959* (2013.01); *C10J 2300/0973* (2013.01); *C10J 2300/0986* (2013.01); *Y02P 20/145* (2015.11)

(58) Field of Classification Search
CPC ...................................................... B01J 8/003
See application file for complete search history.

(56) References Cited

U.S. PATENT DOCUMENTS

| | | | | |
|---|---|---|---|---|
| 2,851,401 | A * | 9/1958 | Payne | B01J 3/02 177/114 |
| 5,895,508 | A * | 4/1999 | Halow | C10J 3/26 48/63 |
| 6,048,374 | A * | 4/2000 | Green | C10B 7/10 110/235 |
| 8,721,748 | B1 * | 5/2014 | Potgieter | B01J 6/008 48/61 |
| 2002/0069798 | A1 | 6/2002 | Aguadas Ellis | |
| 2007/0003459 | A1 * | 1/2007 | Stadlbauer | C10L 37/10 422/219 |
| 2009/0090054 | A1 * | 4/2009 | Hobbs | C10J 3/506 48/77 |

(Continued)

OTHER PUBLICATIONS

Clarke, Hybrid Vam and Coal Waste Fired Power Generation. M.E.T.T.S Pty. Ltd., White Papers 1999-2010.

(Continued)

*Primary Examiner* — Imran Akram
(74) *Attorney, Agent, or Firm* — Sheppard Mullin Richter & Hampton

(57) ABSTRACT

Embodiments of the invention are directed toward a coaxial gasifier for enhanced hydrogen production, comprising: downdraft gasifier comprising a hot zone for converting biomass to synthesis gas; and a coaxial gas converter disposed within the downdraft gasifier, the coaxial gas converter comprising a biochar inlet valve, a coaxial char tube, and a biochar and ash outlet valve.

9 Claims, 4 Drawing Sheets

(56) References Cited

U.S. PATENT DOCUMENTS

| | | | |
|---|---|---|---|
| 2010/0040510 A1* | 2/2010 | Randhava | C01B 3/025 |
| | | | 422/140 |
| 2010/0242353 A1* | 9/2010 | Jovanovic | C01B 3/22 |
| | | | 44/639 |
| 2011/0176968 A1 | 7/2011 | Fan et al. | |
| 2011/0189054 A1* | 8/2011 | Sheng | B01J 8/003 |
| | | | 422/139 |
| 2012/0144742 A1 | 6/2012 | Neves et al. | |
| 2015/0083971 A1* | 3/2015 | Paskach | C10J 3/56 |
| | | | 252/373 |

OTHER PUBLICATIONS

Infinity Energy Pvt. Ltd. Biomass Gasifiers. Products Page. Infinite Energy Pvt. Ltd. 2011.

Patent Cooperation Treaty, International Search Report for PCT/US2014/046917, dated Nov. 17, 2014, pp. 1-2.

* cited by examiner

COAXIAL GASIFIER FOR ENHANCED HYDROGEN PRODUCTION

RELATED APPLICATIONS

This application claims priority to U.S. Provisional Patent Application No. 61/856,228 filed on Jul. 19, 2013, the content of which is incorporated herein by reference in its entirety.

FIELD OF THE INVENTION

The invention broadly relates to gasifier applications and, more particularly, to a coaxial gasifier for enhanced hydrogen production.

BACKGROUND OF THE INVENTION

Gasification is widely used throughout the energy and chemical industries. Gasifiers come in an extremely wide range of sizes and configurations ranging from handheld to 30 stories tall. Gasification of biomass is an important and established technology to provide combustible gases which feed other processes such as electricity production. During World War II, it is estimated that about 1 million small downdraft gasifiers were pressed into service to power engines while gasoline was extremely hard to obtain.

Biomass gasification is typically performed with air, leaving a large residual of nitrogen gas in the resultant combustible gas stream. The ideal conversion of biomass carbon to synthesis gas with air can yield nearly 40% carbon monoxide in nitrogen, but virtually no hydrogen at all if there is no input water and no partially charred input feed. In practice, there are hydrogen sources in the input feeds, but nitrogen and carbon monoxide dominate the output with further degradation via contaminants, irregularities in flow and control which result in high concentrations of carbon dioxide and water vapor in the output gas further degrading the hydrogen concentration.

SUMMARY OF THE INVENTION

Embodiments of the invention are directed toward a coaxially located add-on system which can produce a high concentration of hydrogen using thermal energy and biochar, which are both generated by the host gasifier. The hydrogen rich gaseous output stream has a wide range of applications, particularly including use as the igniter gas as set forth in co-filed Provisional Patent Application No. 61/856,235 titled AN IGNITION SYSTEM FOR LOW GRADE SYNTHESIS GAS AT HIGH COMPRESSION, the content of which is incorporated herein by reference in its entirety.

In some embodiments, the invention comprises an add-on to small or medium sized downdraft gasifiers in the 10 kW to 10 MW thermal range. However, it can be adapted to virtually any type of gasifier via straightforward mechanical engineering as would be appreciated by those of ordinary skill in the art of gasifier design.

One embodiment comprises a coaxial gasifier for enhanced hydrogen production, comprising: downdraft gasifier comprising a hot zone for converting biomass to synthesis gas; and a coaxial gas converter disposed within the downdraft gasifier, the coaxial gas converter comprising a biochar inlet valve, a coaxial char tube, and a biochar and ash outlet valve.

DETAILED DESCRIPTION

In the following paragraphs, embodiments of the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
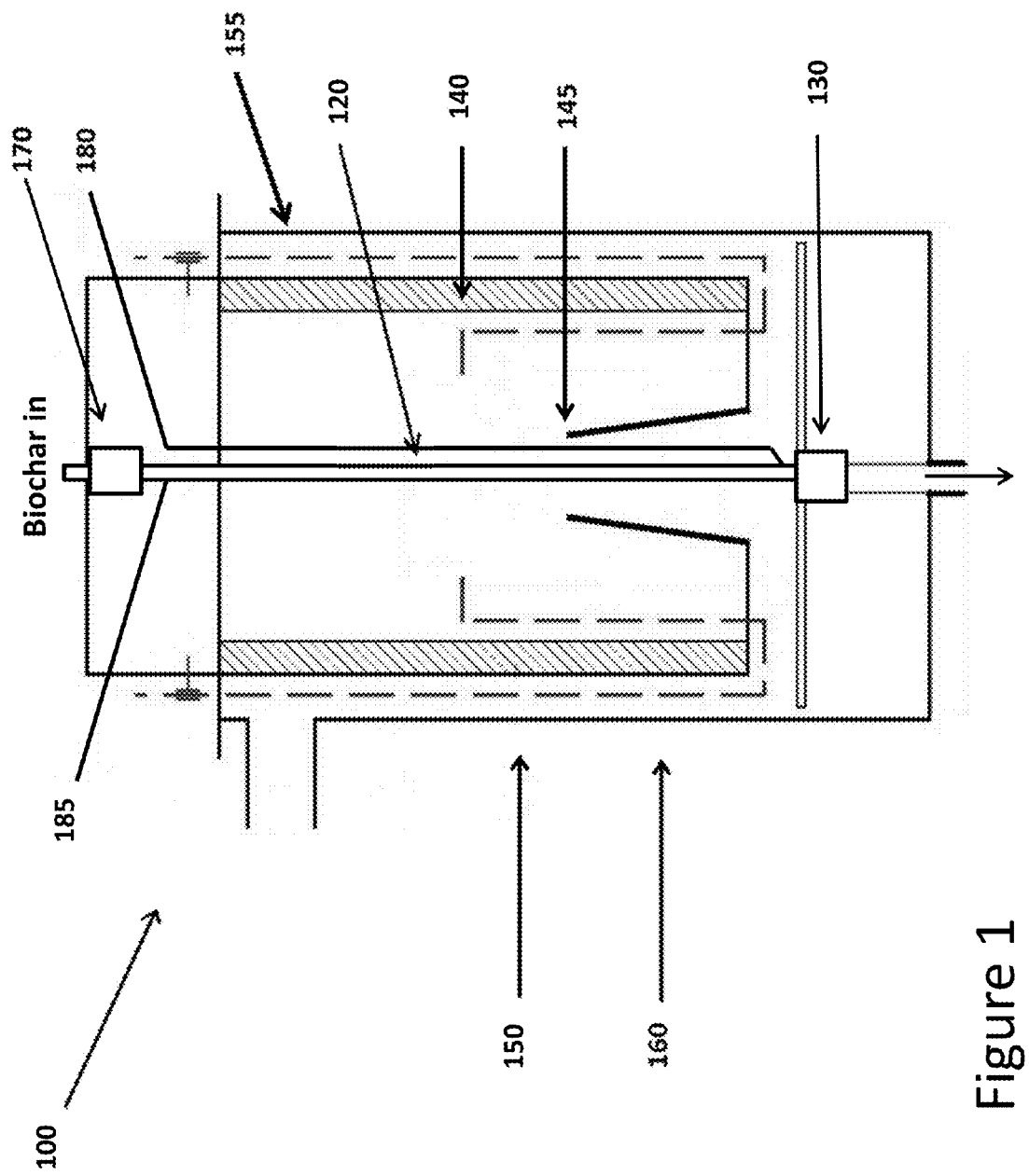
FIG. 1 is a sectional view of a coaxial gas converter in a downdraft gasifier.
Figure 2:
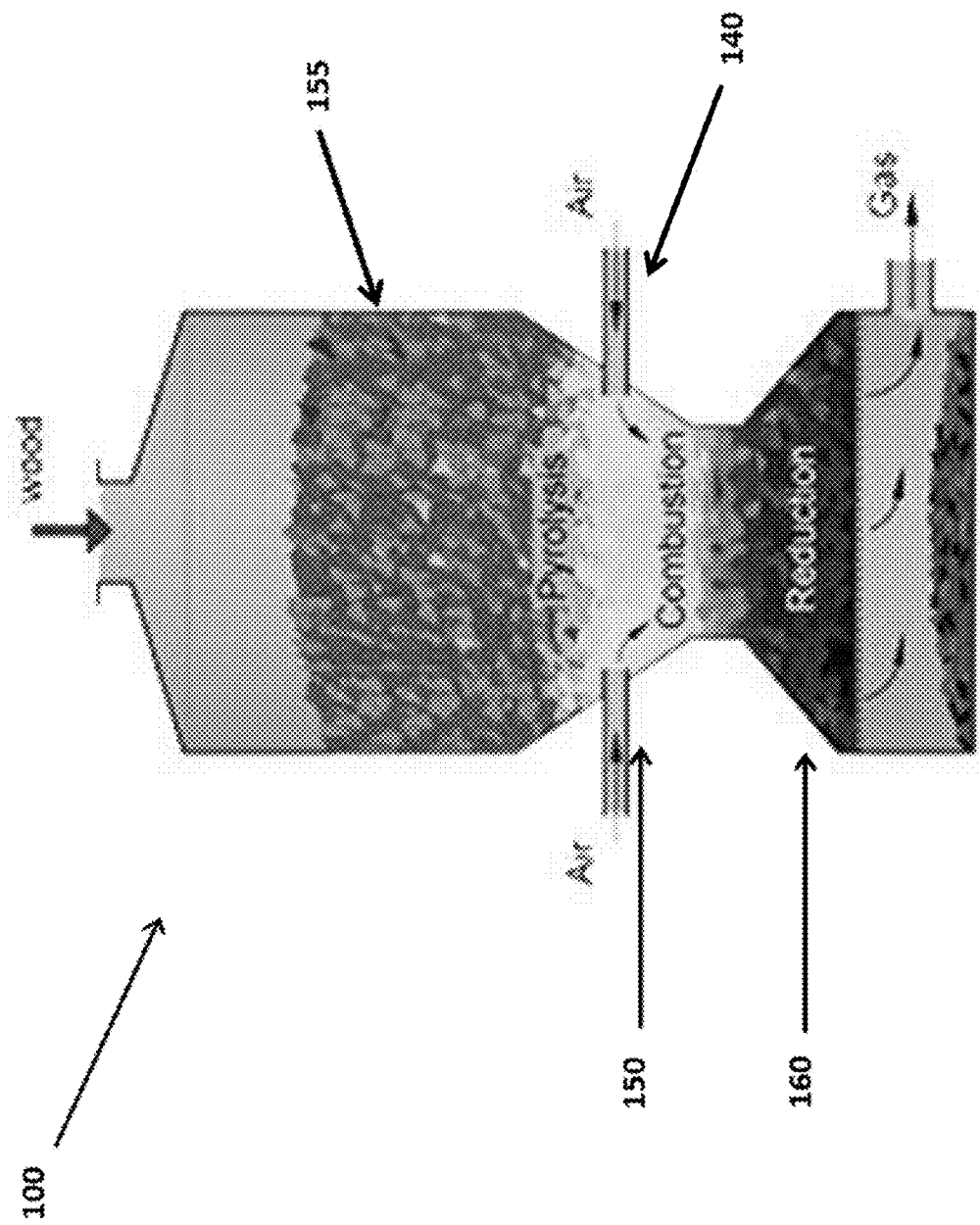
FIG. 2 is a diagram depicting the hot zone within a gasifier such as the gasifier of FIG. 1.

FIG. 1 is a sectional view of a coaxial gas converter in a downdraft gasifier 100, while FIG. 2 is a diagram depicting a hot zone 150 within the downdraft gasifier 100. By way of example, the downdraft gasifier 100 may comprise a downdraft reactor such as described in the Handbook of Biomass Downdraft Gasifier Engine Systems by Thomas Reed and Agua Das, the content of which is incorporated herein by reference in its entirety. Such a gasifier 100 can be modified, as illustrated in FIG. 1, to include a coaxial gas converter comprising a biochar inlet valve 170, a coaxial char tube 120, and a biochar and ash outlet valve 130.

With further reference to FIGS. 1 and 2, the downdraft gasifier 100 uses a plurality of air inlet jets 140 to create the hot zone 150 in its reduction bell area 160 when operated on biomass or other carbonaceous materials. The thin walled char tube 120 is coaxially located from the top to the bottom of the gasifier 100 and is substantially circular in cross-section. This tube 120 is filled with highly reduced biochar carbon that can be produced by the main chamber 155 of the host gasifier 100, other gasifier, or other char making device. The input is metered in through biochar inlet valve 170, which may comprise a conventional valve such as a remotely controlled ball valve. The char initially falls into the tube 120 building a standing column of char in the tube 120 which extends above the air inlet nozzles 145 of the main gasifier 155. Under normal operation of the main gasifier 155, an extended hot zone 150 forms from above air inlet nozzles 145 to the bottom of the reduction bell 160. In some embodiments, the hot zone 150 peaks at well over 800 degrees C. and often as high as 1200 degrees C.

Carbon char in tube 120 can be at equilibrium temperature based on the hold time of that char in conjunction with the ratio of open throat diameter to inner tube diameter. By way of example, for a 2½ inch diameter reduction bell opening, a suitable inner tube diameter is ¾ inch. Water vapor can be added on a controlled, on demand, basis through a down tube 180 which pre-heats the steam to the local temperature. When this steam passes through the carbon, conversion to carbon monoxide and hydrogen occurs. The reaction proceeds relatively quickly above 800 degrees C. and is generally usable in the 800 degrees to 1200 degrees C. operating range. A surplus of carbon in the center tube 120 above the hottest zone in the gasifier 100 assures that all intermediate carbon dioxide reduces to carbon monoxide. The resultant approximately 50/50 mix of hydrogen and carbon monoxide passes up the tube 120 through additional standing char and open space to the cooler upper region, and then out through output line 185. If the input biochar is not highly reduced, then additional water vapor and carbon dioxide can be generated in the upper cooler region of the tube 120, thereby degrading the output.

During operation, biochar literally evaporates to carbon dioxide and then carbon monoxide leaving behind residual ash. The ash build up in the coaxial char tube 120 can impair gas flow and will ultimately move the unreacted carbon up the tube out of the high temperature hot zone 150. Accordingly, it must be periodically dumped through the outlet valve 130 to prevent ash buildup. Additionally, the ash can become so hot as to partially glassify and plug the system. As a result, some amount of incompletely reacted biochar must be allowed to slip through the system to dilute the ash concentration. Char size reduction ratios of 8:1 are possible with low ash feedstocks, but have to be limited to lower ratios with high ash feedstocks such as rice hulls.

In accordance with some embodiments of the invention, the center tube geometry is not limited to a circular cross section. Downdraft gasifiers typically have five or more radially oriented input jets. Accordingly, a star pattern cross section that fits between the jets can provide additional throughput capacity as necessary by creating a larger cross section in the hot zone.

Figure 3:
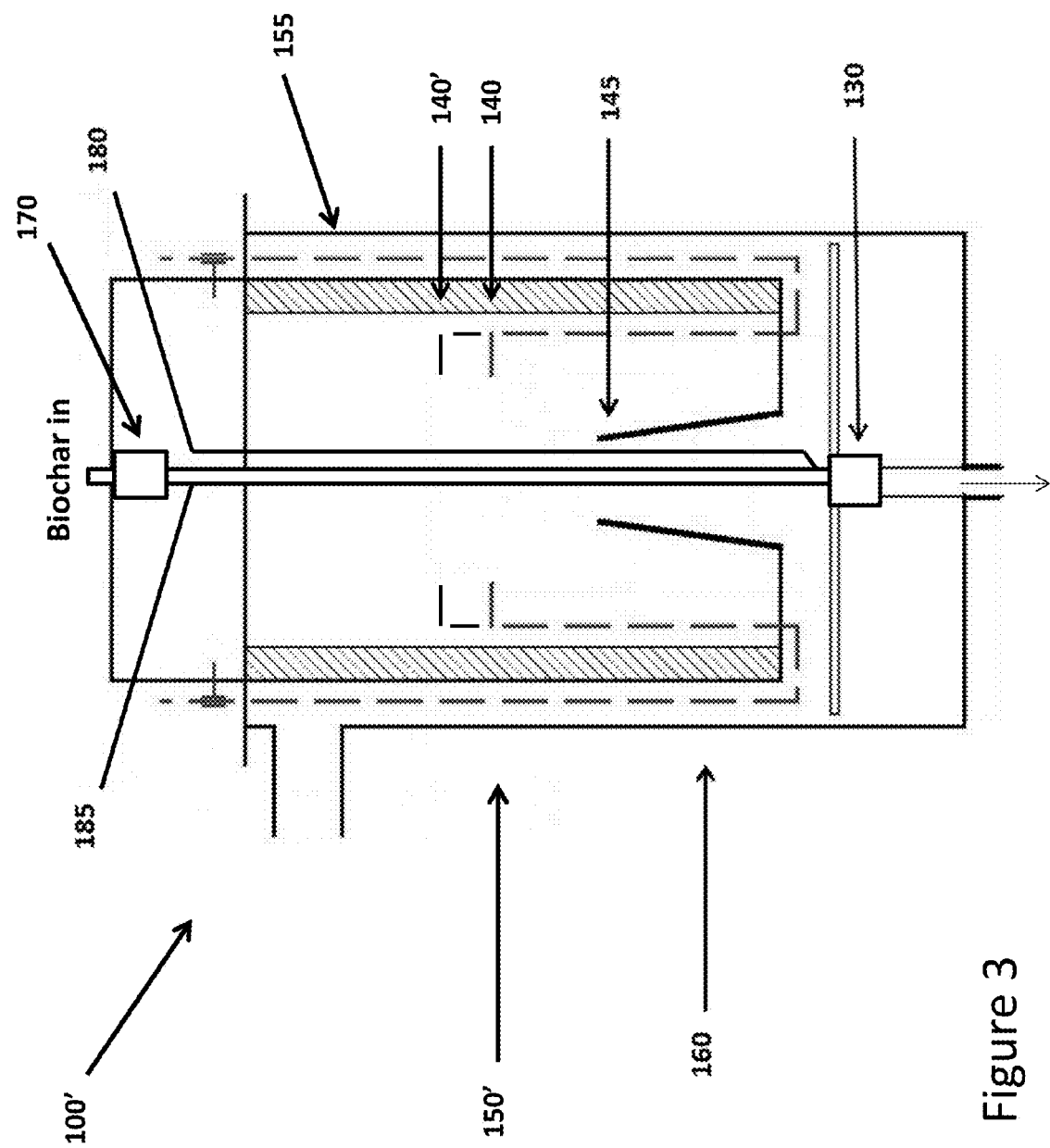
FIG. 3 is a sectional view of an alternative coaxial gas converter in a downdraft gasifier, including additional air jets for extending the hot zone.
Figure 4:
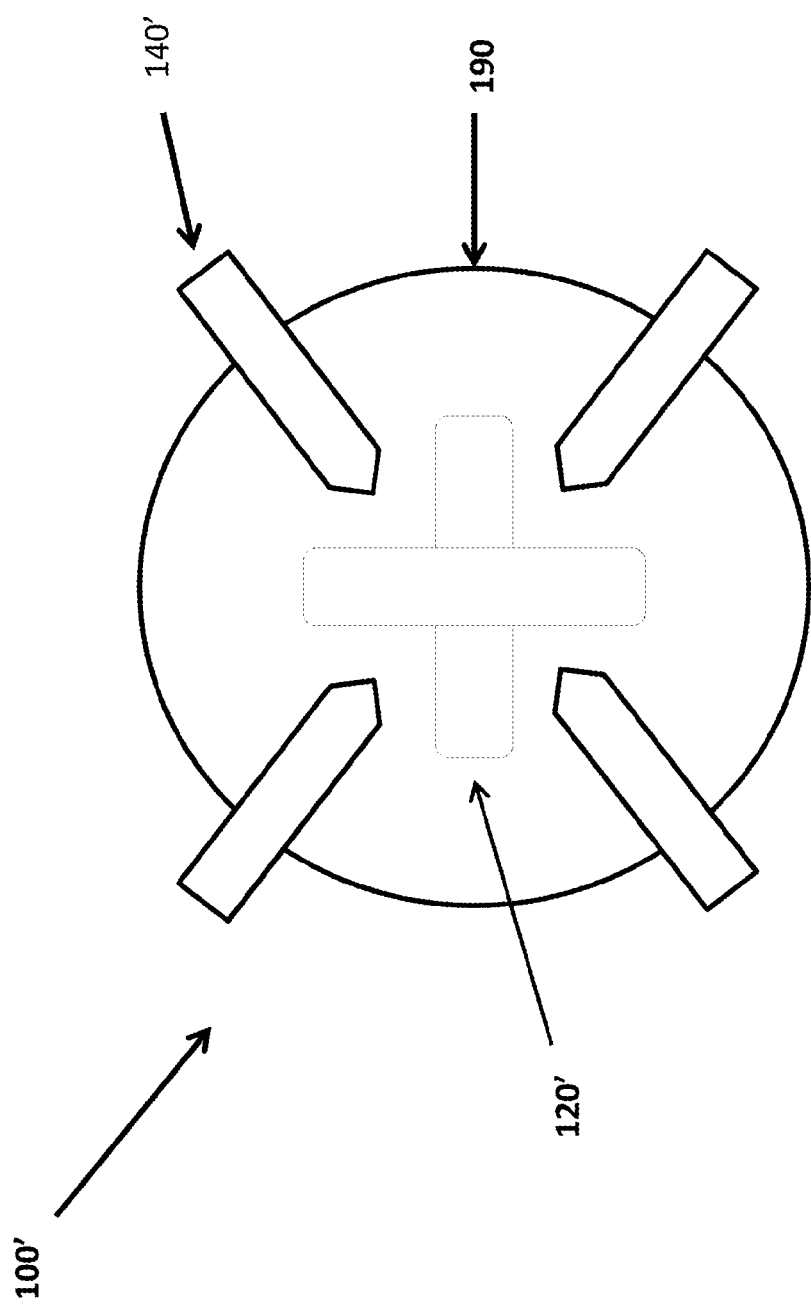
FIG. 4 is a cross-sectional view of the coaxial gas converter in a downdraft gasifier of FIG. 3, with the cross-section taken through the plane of the additional air jets.

FIG. 3 is a sectional view of an alternative coaxial gas converter in a downdraft gasifier 100', including additional air jets 140' to extend the hot zone 150'. Gasifier 100' is otherwise similar to the gasifier 100 of FIGS. 1-2, and like elements have been labeled accordingly. FIG. 4 is a cross-sectional view of the coaxial gas converter in a downdraft gasifier of FIG. 3, with the cross-section taken through the plane of the additional air jets 140'. More particularly, this embodiment features a non-circular gas converter char tube 120' in a 4-jet 140' configuration. The non-circular coaxial gasifier char tube 120', which is disposed within the inner wall 190 of the main gasifier 155, features an enhanced surface are to volume ratio, thus resulting in the extended hot zone 150'. According to further embodiments, any number of additional air jets 140' (e.g., 1, 2, 3, 5, 6, 7, 8, etc.) can be employed, and the invention is in no way limited to the 4-jet configuration depicted in FIG. 4. Moreover, although the tube 120' is depicted having a cross-shaped or plus-shaped or cross-section, and other type of non-circular cross-section, such as rectangular, triangular, ovular, star-shaped, etc., can be employed without departing from the scope of the invention.

According to further embodiments, the system of FIGS. 1-4 can also be employed to decompose hydrocarbons to carbon and hydrogen. However, this function requires a co-reaction so that there is net carbon use. Otherwise, the catalytic reduction function of the high surface area biochar is reduced by surface coking.

In some embodiments of the invention, system wide residual hydrocarbon gases are routed into the input stream with steam in order to provide hydrogen concentrations well above 1:1 with carbon monoxide in the output.

In certain embodiments, the hot section (i.e., the section within hot zone 150) of the coaxial char tube 120 is made from a high temperature alloy such as Inconel 601.

In further embodiments, the coaxial gas converter can be operated at a pressure independent from the main gasifier 155 provided that there is sufficient yield strength in the center tube 120 at 1200 degrees C. to tolerate the pressure differential.

Example Data

A small downdraft gasifier with a counterflow heat exchanger feeding the gasifier air jets is used for the following test. The gasifier features an 8-inch core diameter and a 32-inch active height. The nozzle diameter is 1.5 inches. Five radial air jets are located on a 3-inch diameter 3.5 inches above the nozzle. A vacuum air draw through the system produces 6.4 CFM at the air inlet. The jets are 0.187 inches in diameter. The system is fueled with retail grade douglas fir wood pellets suitable for pellet stove use. After one hour of continuous operation, the temperature profile along the center axis of the gasifier was measured as per Table 1.

TABLE 1

Temperature along center axis of a small coaxial gasifier/gas converter

| Distance from plane of air jets: | Temperature in degrees Celsius |
|---|---|
| 3" above | 802 |
| 2" above | 1130 |
| 1" above | 1225 |
| On plane | 1000 |
| 1" below | 955 |
| 2" below | 905 |
| 3" below | 808 |

As per Table 1, the usable hot section for gas conversion is approximately 6 inches long centered on the plane of the air jets in the embodiment of FIG. 1. The length of the hot section can be increased by adding one or more additional planes of air jets as per the embodiment of FIG. 3.

When the coaxial gas converter is operating with an endothermic reaction, the distance from the outer wall to the center is important, so as to provide sufficient energy to maintain reaction at the desired rate. One approach is to lengthen the reaction zone with additional jets as per the embodiment of FIG. 3. A second approach, which can be used in conjunction with additional jets or independently, is to vary the cross-sectional geometry of the coaxial gas converter to optimize the surface area to volume as per the embodiment of FIG. 4. Generally, the highest temperatures are achieved radially from the tips of the air jets so that conforming the gas converter cross section around the jets can improve energy transfer.

The following are example reactions in the coaxial gas converter in the presence of catalytically active biochar above 800° C.:

$O_2 + 2C = 2CO$ exothermic                                                 A.

$H_2O + C = H_2 + CO$ endothermic                                    B.

$CO + H_2O = H_2 + CO_2$ exothermic                                  C.

$CH_4 = 2H_2 + C$ exothermic                                            D.

The basic reaction is "B", which can produce a 50/50 mix of hydrogen and carbon monoxide. The hydrogen concentration via this path can be enhanced with a high temperature water gas shift reaction, "C". This can be catalyzed by minerals in the biochar or by a downstream water shift catalyst which, in turn, can be heated via the coaxial gasifier. This conversion step by itself will only increase the hydrogen concentration to the 65% range, but, commercial polymer $CO_2$ membranes can eliminate most of the carbon dioxide yielding 95% $H_2$ with 2-3% CO and 2-3% $CO_2$ suitable for many applications.

Hydrocarbons such as methane are commonly present in the main gasifier output when raw biomass is used as a feedstock. Several types of biochar catalyze the decomposition of hydrocarbons in the 900° C. range, as per "D". This reaction proceeds until the hydrocarbon deposited carbon fouls out the micro-porous catalytically active biochar. This deposited carbon can be cleared several ways. In a first approach, the coaxial gas converter can be periodically purged with air or oxygen which tends to preferentially burn off the deposited carbon. Since this is the same reaction as the main gasifier, its output can be routed to the gasifier for system use. A second approach is to co-feed $H_2O$ with the hydrocarbon at a rate high enough to slowly ablate the biochar. The hydrocarbon decomposes to hydrogen and carbon exothermically, and water and carbon endothermically combine to form more hydrogen and carbon monoxide which, in turn, can be water shifted to produce even more hydrogen. Processes such as these can produce high concentrations of hydrogen in the output stream without the use of separation membranes or pressure swing absorbers downstream.

Cleaning/Clearing of Gas Converter

The gas converter comprises only a small percentage of the thermal mass of the main gasifier and it can be designed to have high thermal conduction to the main gasifier. This can allow it to be cleared with oxygen or air to burn out biochar jams.

Since the gas converter has a relatively small cross sectional area, it can operate at much higher pressures than the gasifier system provided that it is fabricated from high temperature, high yield strength alloys. This allows it to be pressure purged either in conjunction with burn off or with non-reactive gasses such as a compressed output from the main gasifier.

One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The invention claimed is:

1. A method for converting biomass to synthesis gas, comprising:
   providing a downdraft gasifier having a coaxial gas converter, the coaxial gas converter comprising a char tube coaxially located from the top to the bottom of the gasifier;
   forming an extended hot zone from a plurality of air inlet jets, such that the extended hot zone is created in a reduction bell of the gasifier; and
   metering catalytically active biochar comprising highly reduced biochar carbon generated above 800° C. into the char tube using a biochar inlet valve coaxially located with the char tube, allowing the biochar to fall into char tube and building a standing column of the biochar in the tube, resulting in the production of at least hydrogen.

2. The method of claim 1, further comprising running one or more of the following reactions in the coaxial gas converter in the presence of catalytically active biochar above 800° C.:

$$O_2 + 2C = 2CO \qquad \text{A.}$$

$$H2O + C = H_2 + CO \qquad \text{B.}$$

$$CO + H2O = H2 + CO2 \qquad \text{C.}$$

$$CH_4 = 2H_2 + C. \qquad \text{D.}$$

3. The method of claim 1, further comprising periodically purging the coaxial gas converter using air or oxygen.

4. The method of claim 1, further comprising clearing the coaxial gas converter using a pressure pulse.

5. The method of claim 1, further comprising adding water vapor to a main chamber of the gasifier to convert carbon to carbon monoxide and hydrogen.

6. The method of claim 5, further comprising reducing all intermediate carbon dioxide to carbon monoxide.

7. The method of claim 6, further comprising passing the resultant mix of hydrogen and carbon monoxide up the char tube through additional standing char and open space to a cooler upper region, and then out through an output line.

8. The method of claim 1, further comprising periodically dumping ash build up in the char tube through an outlet valve to prevent ash buildup.

9. The method of claim 1, wherein the biochar is generated above 1000° C.

* * * * *